US012551701B2

(12) United States Patent
Single et al.

(10) Patent No.: US 12,551,701 B2
(45) Date of Patent: Feb. 17, 2026

(54) CHARGE MONITOR

(71) Applicant: Saluda Medical Pty Limited, Artarmon (AU)

(72) Inventors: Peter Single, Artarmon (AU); Dean Karantonis, Maroubra (AU)

(73) Assignee: Saluda Medical Pty Limited, Macquarie Park (AU)

(*) Notice: Subject to any disclaimer, the term of this patent is extended or adjusted under 35 U.S.C. 154(b) by 615 days.

(21) Appl. No.: 17/287,419

(22) PCT Filed: Oct. 23, 2019

(86) PCT No.: PCT/AU2019/051162
§ 371 (c)(1),
(2) Date: Apr. 21, 2021

(87) PCT Pub. No.: WO2020/082127
PCT Pub. Date: Apr. 30, 2020

(65) Prior Publication Data
US 2021/0387004 A1 Dec. 16, 2021

(30) Foreign Application Priority Data
Oct. 23, 2018 (AU) .................. 2018904016

(51) Int. Cl.
A61N 1/36 (2006.01)
A61N 1/02 (2006.01)
A61N 1/05 (2006.01)

(52) U.S. Cl.
CPC ......... A61N 1/36139 (2013.01); A61N 1/025 (2013.01); A61N 1/36125 (2013.01);
(Continued)

(58) Field of Classification Search
CPC ............. A61N 1/36139; A61N 1/025; A61N 1/36125; A61N 1/36157; A61N 1/0551; A61B 5/388; H02J 7/00712
See application file for complete search history.

(56) References Cited

U.S. PATENT DOCUMENTS 7,225,016 B1    5/2007  Koh
7,801,600 B1 *  9/2010  Carbunaru ......... A61N 1/37264
                                                        607/2
(Continued)

FOREIGN PATENT DOCUMENTS

WO   WO-2017142948 A1 *  8/2017  ........... A61N 1/0556
WO   WO 2019/157559          8/2019
(Continued)

OTHER PUBLICATIONS

Australian Patent Office, International Search Report and Written Opinion of the International Searching Authority, International Application No. PCT/AU2019/051162, Feb. 17, 2020, 16 pages.
(Continued)

Primary Examiner — Carl H Layno
Assistant Examiner — Maria Catherine Anthony
(74) Attorney, Agent, or Firm — Barnes & Thornburg LLP

(57) ABSTRACT

This disclosure relates to implantable neuro stimulation devices with a feedback loop to control an amount of energy delivered into a neural tissue based on a measured evoked neural response. Stimulation electrodes deliver stimulation energy to neural tissue and a stimulator comprises a microprocessor and program memory with program code, which causes the microprocessor to perform closed-loop control of the stimulation energy based on a feedback signal that is indicative of an evoked neural response. A charge monitor monitors the delivery of energy to the stimulation electrodes by determining an amount of charge delivered by the stimu-
(Continued)

lation electrodes and connected to the stimulator to provide a status signal indicative of the charge delivered to the stimulator. The device adjusts the control of the stimulation energy in response to the status signal from the charge monitor indicating undesirable charge delivery to the stimulation electrodes.

19 Claims, 9 Drawing Sheets

(52) U.S. Cl.
CPC ..... *A61N 1/36142* (2013.01); *A61N 1/36157* (2013.01); *A61N 1/0551* (2013.01); *A61N 1/36071* (2013.01)

(56) References Cited

U.S. PATENT DOCUMENTS

| | | | |
|---|---|---|---|
| 2005/0187590 | A1 | 8/2005 | Boveja et al. |
| 2007/0162086 | A1* | 7/2007 | DiLorenzo ............... A61B 5/24 607/45 |
| 2011/0270359 | A1* | 11/2011 | Colborn ................. A61N 1/025 607/62 |
| 2013/0043829 | A1* | 2/2013 | Gurlahosur ....... H02J 7/007182 320/107 |
| 2014/0243926 | A1* | 8/2014 | Carcieri ............. A61N 1/36071 607/46 |
| 2017/0181669 | A1 | 6/2017 | Lin et al. |
| 2018/0078761 | A1 | 3/2018 | Bolea et al. |
| 2018/0085593 | A1* | 3/2018 | Fayram ................ A61N 1/0551 |

FOREIGN PATENT DOCUMENTS

| | | | | |
|---|---|---|---|---|
| WO | WO-2019157559 | A1 * | 8/2019 | ........... A61N 1/0551 |
| WO | 2020082127 | A1 | 4/2020 | |

OTHER PUBLICATIONS

International Preliminary Report on Patentability for International Application No. PCT/AU2019/051162, Issued Apr. 27, 2021, 9 pgs.

* cited by examiner

CHARGE MONITOR

RELATED APPLICATIONS

This application claims priority from Australian Provisional Application 2018904016 filed on 23 Oct. 2018, which is included herein by reference in its totality.

TECHNICAL FIELD

This disclosure relates to implantable neuro stimulation devices with a feedback loop to control an amount of energy delivered into a neural tissue based on a measured evoked neural response.

BACKGROUND

Implantable neuro-stimulation devices provide significant benefits to patients suffering from chronic pain and other diseases. These devices may include sophisticated control algorithms that adjust stimulation output in a closed-loop control paradigm, such as PID control, which can be implemented as software running on a microprocessor.

However, the use of software may bear the risk of software glitches, bugs, soft errors and other unforeseen malfunctions. Such circumstances can lead to significant discomfort to the patient and in particular, overstimulation that may be more painful that the actual pain that is being addressed by the stimulation at the first place.

In particular, when a control loop measures the evoked response, a change in posture by the patient, for example, may change the sensitivity and/or impedance of the electrodes, which, in turn, may change the loop gain and the loop may oscillate. In other words, the threshold and slope of response curve changes when patient moves, which makes closed-loop control difficult.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

An implantable neuro-stimulation device comprises:
multiple stimulation electrodes configured to deliver stimulation energy to neural tissue;
a stimulator comprising a microprocessor and program memory with program code stored thereon, the program code, when executed by the microprocessor, causing the microprocessor to perform closed-loop control of the stimulation energy based on a feedback signal that is indicative of an evoked neural response; and
a charge monitor to monitor the delivery of energy to the stimulation electrodes by determining an amount of charge delivered by the stimulation electrodes and connected to the stimulator to provide a status signal indicative of the charge delivered to the stimulator, wherein the device is configured to adjust the control of the stimulation energy in response to the status signal from the charge monitor indicating undesirable charge delivery to the stimulation electrodes.

The stimulator may comprises a current source and the microprocessor may be configured to provide a current source activation signal to the current source to activate and de-activate the current source to thereby control the amount of charge delivered by the stimulation electrodes. Further, the charge monitor may be connected to the current source activation signal to monitor the delivery of energy to the stimulation electrodes by monitoring the current source activation signal.

The stimulator may comprise a current source formed of a first and second transistor connected to each other by respective gate electrodes and the charge monitor is connected to the gate electrodes.

The charge monitor may comprise a third transistor with a gate electrode coupled to the gate electrodes of the first and second transistors, the third transistor providing through a source and drain electrode a current source activation signal.

The charge monitor may be configured to determine an integral of delivered current over a time period when stimulation is activated by the processor.

The charge monitor may be further connected to a reference current signal indicative of an instant amplitude of a reference current and the integral over the time period is based on the reference current signal.

The charge monitor may be configured to monitor a stimulation activation signal from the processor and the stimulation activation signal is a digital signal.

The status signal may be provided to the microprocessor as an interrupt signal and the device is configured to adjust the control of the stimulation energy by way of an interrupt handling routine that adjusts the control of the stimulation energy.

The device may be configured to adjust the control of the stimulation energy by way of a hardware circuit that disables stimulation in response to the status signal from the charge monitor indicating undesirable charge delivery to the stimulation electrodes.

The microprocessor may be configured to adjust the control of the stimulation energy by one or more of:
  stopping stimulation;
  adjusting an amplifier gain of a feed-back loop;
  adjust a stimulation level; and
  enable/disable closed-loop therapy.

The charge monitor may be configured to provide an error type signal to the microprocessor and the microprocessor may be configured to create a data record on memory indicative of the error type signal for later readout by a user.

The charge monitor may be further configured to detect a charge imbalance error and in response, activate a charge imbalance status signal provided to the microprocessor.

The charge monitor may be further configured to detect a accumulated charge error and in response, activate an accumulated charge status signal provided to the microprocessor, wherein the accumulated charge error is indicative of an accumulated charge estimate of one or more of the stimulation electrodes is non-zero during a shorting event.

The charge monitor may be further configured to detect a charge waste error and in response, activate a charge waste status signal provided to the microprocessor, wherein the charge waste error is indicative of one or more of the stimulation electrodes being connected to both a sink and source at the same time.

The charge imbalance status signal, the accumulated charge status signal and the charge waste status signal may be combined with the status signal indicative of the charge delivered to the stimulator into a single status signal.

A method for neuro-stimulation comprises:
  executing program code to perform closed-loop control of stimulation energy based on a feedback signal that is indicative of an evoked neural response;
  providing the stimulation energy to multiple stimulation electrodes for delivery into neural tissue;
  monitoring the delivery of energy to the stimulation electrodes by determining an amount of charge delivered by the stimulation electrodes; and
  adjusting the control of the stimulation energy in response to the monitoring indicating undesirable charge delivery to the stimulation electrodes.

Optional features described of any aspect of device or method, where appropriate, similarly apply to the other aspects also described here.

BRIEF DESCRIPTION OF DRAWINGS

An example will now be described with reference to the following drawings.

DESCRIPTION OF EMBODIMENTS

Figure 1:
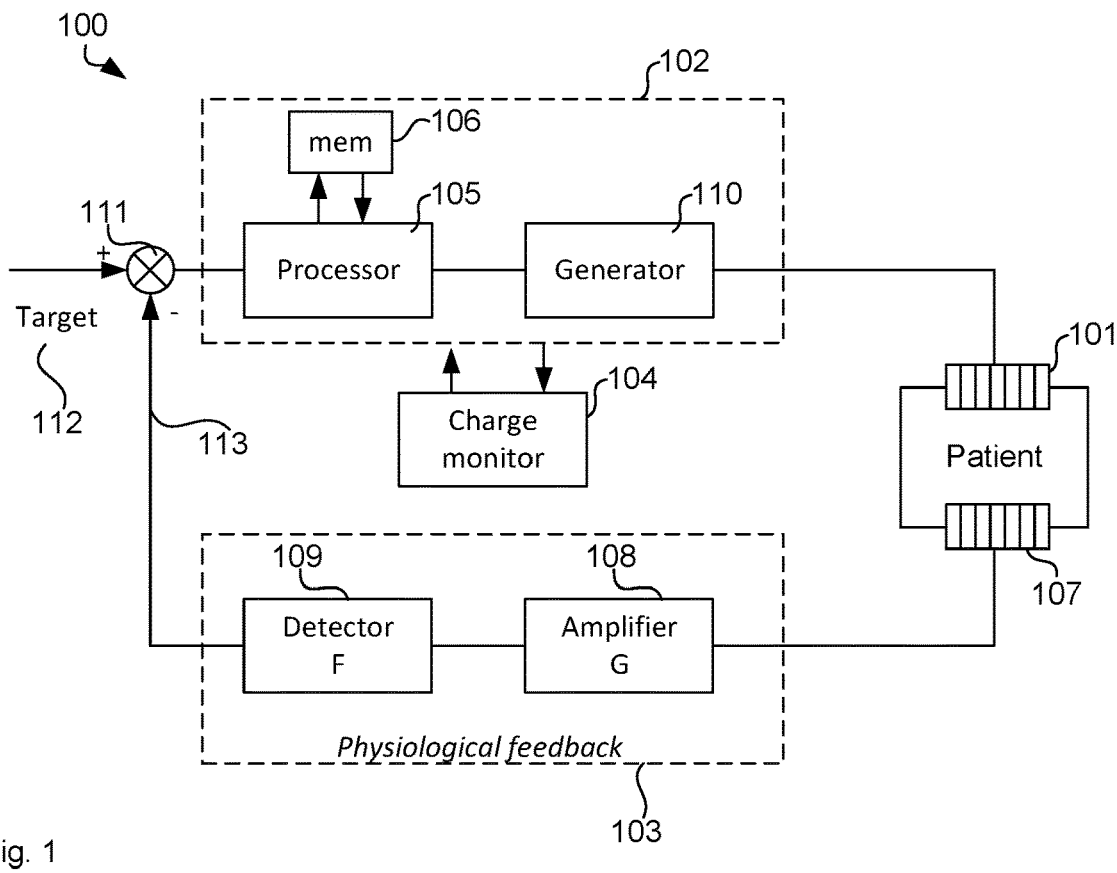
FIG. 1 illustrates an implantable neuro-stimulation device.

FIG. 1 illustrates an implantable neuro-stimulation device 100 comprising multiple stimulation electrodes 101 configured to deliver stimulation energy to neural tissue, a stimulator 102, a feedback signal 103 and a charge monitor 104. Stimulator 102 comprises a microprocessor 105 and program memory 106 with program code stored thereon. The program code, when executed by the microprocessor 105, causes the microprocessor 105 to perform closed-loop control of the stimulation energy based on a feedback signal 103 that is indicative of an evoked neural response. More particularly, there is a subtracter 111 between a target stimulus 112 (set by a clinician or the patient) and the measured response 113. Processor 105 adjusts the stimulation energy so that the output of subtracter 111 is around zero. It is noted that FIG. 1 depicts logical blocks, which can be combined in multiple different ways. For example, subtracter 111 and detector 109 (including an ADC fed by amplifier 108) may be implemented in software also installed on memory 106. In other examples, the modules are hardware components and/or analog implementations.

In one example, there are feedback electrodes 107 in contact with the stimulated neural tissue, which may be the same electrodes as the stimulation electrodes or stimulation and feedback electrodes are dynamically chosen subsets from the entire number of electrodes. In the feedback signal path there is an amplifier 108 and a detector 109 of a evoked compound action potential (ECAP) signal.

Charge monitor 104 monitors the delivery of energy to the stimulation electrodes 101 by determining an amount of charge delivered by the stimulation electrodes 101. Charge monitor 104 is connected to the stimulator 102 to provide a status signal indicative of the charge delivered to the stimulator. Stimulator 102 is configured to adjust the control of the stimulation energy in response to the status signal from the charge monitor indicating undesirable charge delivery to the stimulation electrodes. For example, processor 105 may perform a proportional-integral-differential (PID) control process that is implemented as software on program memory. Other control methods, pure integral control or pure proportional control, may also be used.

While examples herein relate to a processor with program memory and a software implementation, the charge monitor 104 disclosed herein may equally be used to monitor the charge delivered by a hardware controller, such as an ASIC, or other hardware implementation of a PID or other control. For example, in some applications, a proportional control may be sufficient that can be implemented by a relatively simple comparator. However, such an control process may have the risk of developing oscillations or overshoots that may cause instability of the stimulation and/or overstimulation. In those cases, the charge monitor 104 can equally disable stimulation as described herein when a measured charge value is above a set threshold.

In one example, processor 105 has integrated power electronics to drive electrodes 101 directly. In that case, the charge monitor 104 may provide the status signal as an interrupt to processor 105 that has an interrupt handling routine which adjusts the stimulation energy on stops stimulation in response to the interrupt being raised. Alternatively, there may be a switch, such as a transistor in the power signal to the electrodes that is turned off by the status signal from the charge monitor 104.

In another example, as shown in FIG. 1, the stimulator has a separate generator module 110 that includes the power electronics to drive electrodes 101. In particular, generator 110 may comprise current sources, such as current mirrors, to drive an adjustable stimulation current into the electrodes 101. The stimulation current is adjustable in amplitude and duration to change the amount of energy/charge that is being delivered. Generator 110 may also include a memory or shift register in cases where the number of control signals for the current sources and other elements of the generator are more than the number of bits in the output signal of the processor, such as more than 8 signals/bits or more than 16 signals/bits.

Figure 2:
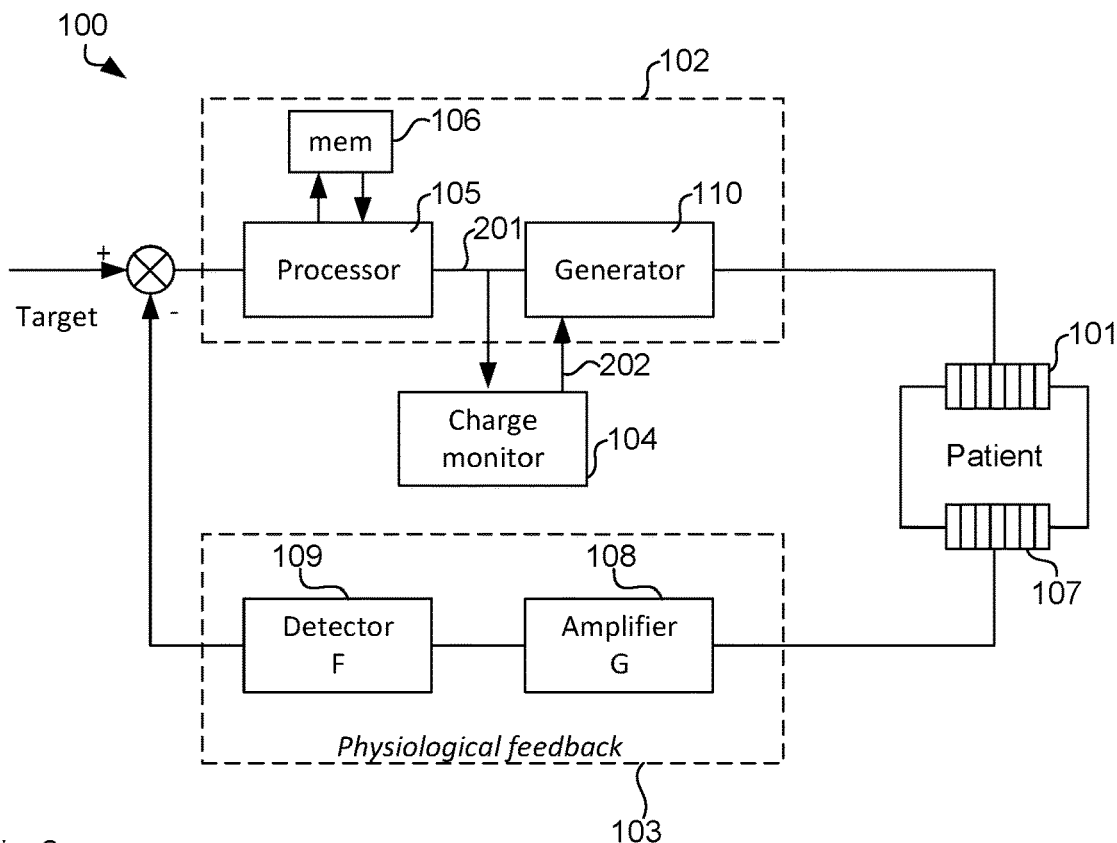
FIG. 2 shows another example of a neuro-stimulation device.

FIG. 2 shows another example where charge monitor 104 is connected to a stimulation control signal 201 between the processor and the generator 110 as an input and provides a status signal 202 to generator 110. In that case, the status signal is basically an enable signal that gets deactivated upon undesirable charge being detected so that stimulation is stopped regardless of the activities by processor 105. For example, charge monitor may read the current amplitude from control signal 201 and integrate the current amplitude over time while a stimulation control signal indicates active stimulation. When the result of that integral is greater than a threshold, such as the user provided maximum stimulation level or a system default maximum, charge monitor 104 deactivates the enable signal 202 to indicate undesirable stimulation energy.

Charge monitor 104 may also provide an error signal to processor 105 to indicate different type of errors that can be logged on memory 106 for later readout by a clinician or technical specialist. Further, processor 105, generator 110 and charge monitor 104 (and potentially memory 106) may be integrated into a single chip where the boundaries between the modules are practically invisible.

Figure 3:
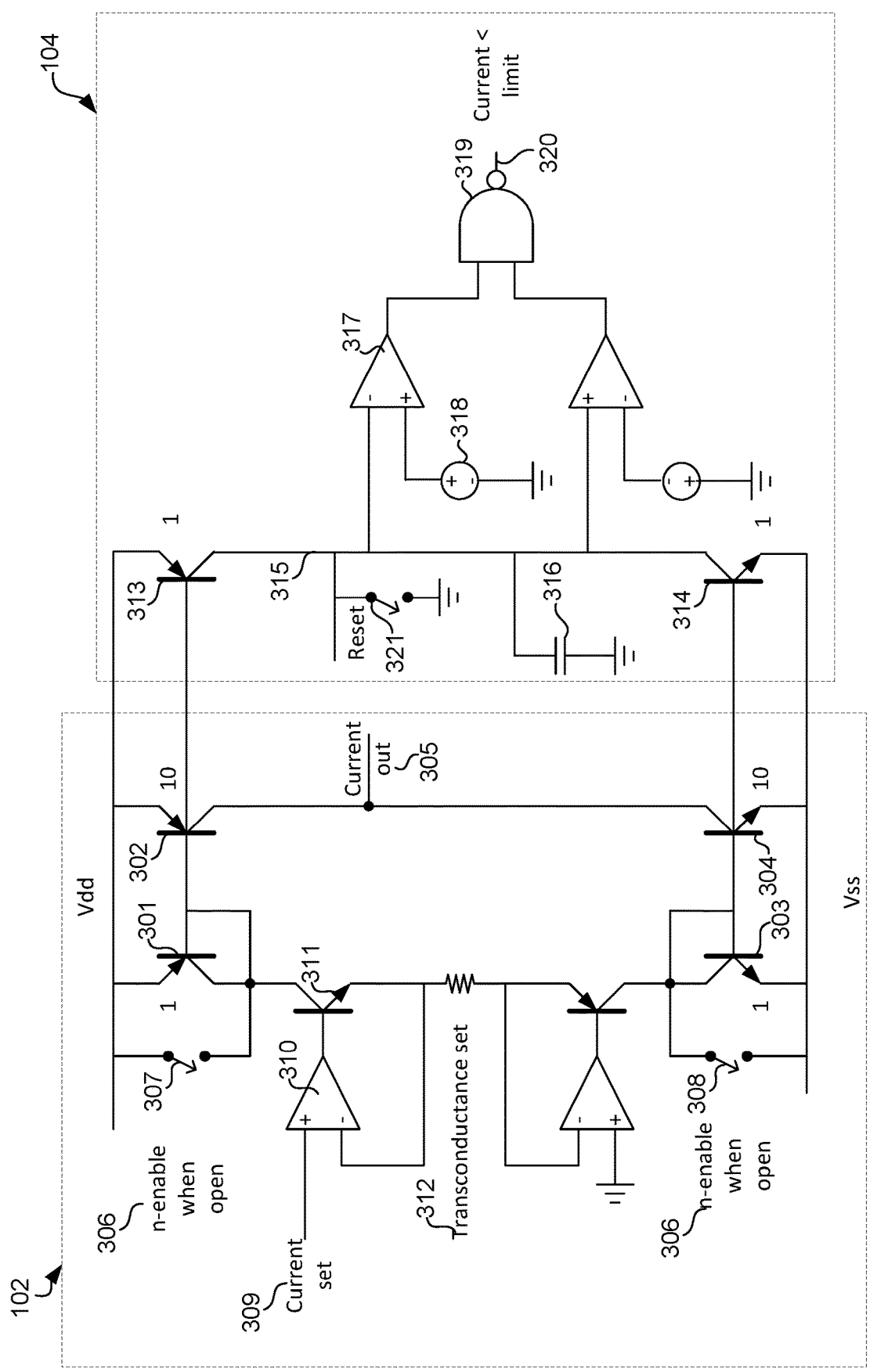
FIG. 3 illustrates the generator and charge monitor from FIGS. 1 and 2 in more detail.

FIG. 3 illustrates an analog generator 102 and charge monitor 104 in more detail. Generator 102 comprises a current source in the form of two current mirrors comprising four transistors 301, 302, 303, 304 that essentially mirror the current through transistor 301 (which is nearly the same as through 303 due to matched sizing) onto a current out signal 305. Microprocessor 105 is programmed to provide a current source activation signal 306 to the current source to activate (open switches 307, 308) and de-activate (close switches 307, 308) the current source. These switches control the time current is enabled to the output which controls the amount of charge delivered by the stimulation electrodes 101. The amount of charge may further be controlled by setting the current through an analog current set signal that is decoupled by an amplifier 310 and controls a control transistor 311 which, in turn, controls the reference current through transistor 301 and therefore the amplitude of the current out signal 305.

While the activation signal 306 and the current set signal 309 can be monitored directly, this would still not detect faults in a transconductance set resistor 312 that may also affect stimulation energy. Therefore, charge monitor 104 is connected to the base terminal of transistor 302 as the voltage on that node ultimately determines the amount of current on the current out signal 305. In this example, charge monitor 104 is connected to that base through monitor transistors 313, 314. The base connection of monitor transistor 313 is coupled to the bases of current mirror transistors 301, 302. The monitor transistor 313 therefore provides on its collector a current source integral signal 315, which also reflects stimulation charge amplitude (as the voltage on capacitor 316 represents a charge which, due to the ratio of 313/302 and 314/304 will be proportional to the current delivered from 305. The charge stored on this capacitor will be ⅒ the charge delivered through 305, and by suitable choice of the capacitor value, any trip value can be set.

A comparator 317 compares the current integral signal to a reference 318. If the comparator output indicates current over the limit 318, a NOR gate 319 switches a status signal 320 to 'LOW' to indicate undesirable charge levels.

It is noted that due to capacitor 316, charge monitor 104 is configured to determine an integral of delivered current over a time period when stimulation is activated by the processor. In other examples, there may be a digital integrator behind an analog/digital converter (ADC). In one example, processor 105 resets the integral after each stimulus because too much charge accumulating on the electrodes 101 may cause electrolysis. Therefore, between stimuli, processor 105 shorts electrodes together to bleed this charge off and reset the charge integrator using a RESET switch 321 also shown in FIG. 3.

The control of the stimulation energy can be adjusted by way of a hardware circuit that disables stimulation. For example, status signal 318 may be the input to an NAND gate that switches to 'HIGH' if status signal 318 switches to 'LOW' and the output of the NAND gate can form the activation signal 306. As a result, in response to the status signal from the charge monitor indicating undesirable charge delivery to the stimulation electrodes, stimulation is stopped by closing switches 307 and 308. This occurs regardless of the activation signal provided from processor 105, which would be the second input to the NAND gate but effectively masked by a 'LOW' on the first input from the status signal. In other examples below, the status signal gates a clock signal provided to the generator.

In other examples, the microprocessor is programmed by way of an interrupt routine, to adjust the control of the stimulation energy by stopping stimulation, adjusting an amplifier gain of amplifier 108 in feed-back loop 103 (see FIG. 1), adjust a stimulation level and enable/disable closed-loop therapy.

It is noted that the circuit implementations provided herein are merely an example and a wide range of implementations may be used to achieve the desired outcome of charge monitoring, such as analog circuits, ASICs, FGPAs, further microcontrollers, custom transistor circuits etc. In particular, the analog circuit of FIG. 3. may be implemented in digital form, where the control value of the current output DAC is monitored, which is the preferred implementation.

The safe charge monitor hardware ensures that no stimulus exceeds the safe charge limit for the electrode and that the stimulus phases are balanced to within 0.1 uC. The safe charge limit is set such that when correct clock frequencies are used, an error condition will not occur for stimuli below 12.7 uC and an error condition will definitely occur for accumulated charge exceeding 15 uC. The generator 110 may indicate these states to the controlling processor 105 using the "error" signal.

The effect of the unbalanced charge situation can be disabled with software from triggering the error pin, however the out-of-charge situation cannot. The out-of-charge function can be disabled for the chip by asserting the safeQdisable pin (pin 120).

The algorithm:
1) Identifies the electrodes selected for stimulation.
2) Integrates the charge to each selected electrode during the stimulation. This is a numerical integration based on the lidac and gidac values. Separate registers integrate the charge for each active electrode. Integration continues as long as stimulation is enabled.
3) The integration is reset to zero each time the electrodes are shorted together.
4) An error condition is raised (error pin is asserted) if:
   a) During the integration, the charge exceeds the hardwired "safe charge limit". If this condition occurs, stimulus is shut down within the AOC chip, and no further stimulus can be applied until the error condition is removed by a shorting event and a subsequent write to clear the sticky bits in the static registers.
   b) At the end of the integration, signaled by the electrode shorting, the total charge delivered to the electrode is non-zero, to within a tolerance called the "imbalance error". This condition can be ignored (masked) by configuration within the SREGs.
   c) The clock used by the safe charge detection hardware is at the wrong frequency or disappears.

The implant using this chip may have capacitor isolation between the current sources and the tissue: charge balance may not be required for safety purposes—unlike non-capacitor designs. However, where the chip is used only with balanced stimuli, then maintaining a check of this may be useful for system debugging.

The stimulation monitor may be fully digital and when an error is detected, the "error" pin is asserted. The design may use a single integrator to mimic an electrode, so the charge per phase can exceed the electrode safe charge limit. This may not constitute a hazard.

As described above, the charge monitor performs the following key functions:

Keeps track of the approximate amount of charge accumulated on each electrode and raises an error (qerror) if it exceeds a certain limit. In one example, the limit is between 13.0 uC and 14.42 uC and may vary between those two values depending on variations in the finite length arithmetic (limited bit size) used in the calculation.

Raises an error (imbalance) if the calculated charge value has not returned to zero by the end of the biphasic stimulation cycle.

Raises an error (wasted) if it detects that an electrode is connected to both a current source (ip) and a current sink (in) at the same time.

To reduce the amount of logic required, it may be assumed that all of the enabled electrodes get all of the current from the enabled current sources. This allows the current to be calculated globally and only the charge needs to be accumulated on a per electrode basis.

The charge monitor may feature a separate charge_accum module for each of 25 electrodes for keeping track of the accumulated charge and checking for per electrode error conditions (ie qerror, imbalance, and wasted). The current_calc module sums together the lidac values (see below for a description of the signals) and multiplies this value by the gidac value. It also gates off the gidac value when gena is low and gates off the lidac values when the corresponding inena and ipena bits are both low.

The current_trunc module rounds up the current value to the nearest 100 uA in order to reduce the number of bits required for the accumulators in the 25 charge_accum modules. The shorting_det module keeps a record of every electrode that has been stimulated and asserts the shorting output when all of these electrodes are simultaneously shorted to either vddhv, gnd, or vgnd. The detection of a shorting event is required for resetting the charge accumulators, and for checking for a charge imbalance error.

TABLE 1

| Signal | Type | Width | Description |
|---|---|---|---|
| rstn | I | 1 | Asynchronous reset (active-low). Normally asserted at power-on. Resets the macrocell into a known state when asserted. |
| qclk | I | 1 | Measurement clock. Nominal frequency 131 kHz (ie $2^{17}$Hz). Clocks the accumulators for keeping track of each electrode's charge, as well as the supporting control logic. |
| safeq_disable | I | 1 | SafeQ disable pin (active-high). Effectively disables all charge_limiter functionality by causing qclk_ena to be gated off. |
| qlim[7:0] | I | 8 | Charge limit setting. Sets the accumulator value at which to assert the qerror signal for each electrode. Its width is less than the accumulator width, so only the most-significant bits for the accumulator are compared. |
| gidac[11:0] | I | 12 | Global IDAC setting. Multiplied with the sum of the lidac settings in each charge_accum module to estimate the current flowing into or out of each electrode. The gidac setting is latched inside the analog, so this is the value that needs to be connected to this port. |
| lidac0[3:0] | I | 4 | Local idac0 setting. For each electrode, this value is summed with the other lidac values if ipoe0 is set for that electrode, and subtracted if inoe0 is set. |
| lidac1[3:0] | I | 4 | Local idac1 setting. For each electrode, this value is summed with the other lidac values if ipoe1 is set for that electrode, and subtracted if inoe1 is set. |
| lidac2[3:0] | I | 4 | Local idac2 setting. For each electrode, this value is summed with the other lidac values if ipoe2 is set for that electrode, and subtracted if inoe2 is set. |
| lidac3[3:0] | I | 4 | Local idac3 setting. For each electrode, this value is summed with the other lidac values if ipoe3 is set for that electrode, and subtracted if inoe3 is set. |
| gena | I | 1 | Global electrode enable. This signal enables the current for all elec- trodes, so this behaviour is modeled by ANDing this signal with the gidac value. |
| vgena | I | 1 | Virtual-ground enable. Enable for the virtual-ground amplifier. Has to be asserted for vgndoe to be used. |
| ipena[3:0] | I | 25 | Ip enables. Enables for ip current sources. This behaviour is modeled by ANDing these signals with their respective lidac values. |
| inena[3:0] | I | 25 | In enables. Enables for in current sinks. This behaviour is modeled by ANDing these signals with their respective lidac values. |

Signal types are: I=input, 0=output, B=bidirectional, T=Tristate Output, P=Power. Load is input capacitance for input ports; rated output poets for output ports. For bidirectional ports, both values are given.

| Signal | Type | Width | Load | Description |
|---|---|---|---|---|
| ipoe3[24:0] | I | 25 | 10fF | Ip3 output enables. Enables for connecting each electrode to the ip3 current source. |
| ipoe2[24:0] | I | 25 | 10fF | Ip2 output enables. Enables for connecting each electrode to the ip2 current source. |
| ipoe1[24:0] | I | 25 | 10fF | Ip1 output enables. Enables for connecting each electrode to the ip1 current source. |

-continued

| Signal | Type | Width | Load | Description |
|---|---|---|---|---|
| ipoe0[24:0] | I | 25 | 10fF | Ip0 output enables. Enables for connecting each electrode to the ip0 current source. |
| inoe3[24:0] | I | 25 | 10fF | In3 output enables. Enables for connecting each electrode to the in3 current sink. |
| inoe2[24:0] | I | 25 | 10fF | In2 output enables. Enables for connecting each electrode to the in2 current sink. |
| inoe1[24:0] | I | 25 | 10fF | In1 output enables. Enables for connecting each electrode to the in1 current sink. |
| inoe0[24:0] | I | 25 | 10fF | In0 output enables. Enables for connecting each electrode to the in0 current sink. |
| vddhvoe[24:0] | I | 25 | 10fF | Vddhv output enables. Enable signals for connecting each electrode to vddhv. |
| gndoe[24:0] | I | 25 | 10fF | Gnd output enables. Enable signals for connecting each electrode to gnd. |
| vgndoe[24:0] | I | 25 | 10fF | Virtual-ground output enables. Enable signals for connecting each electrode to the virtual ground amplifier output. |
| imbalance_disable | I | 1 | 10fF | Imbalance disable pin (active-high). When this signal is asserted, imbalance flags will never be asserted during a shorting event, even if corresponding accumulator is non-zero. |
| any_stimulus | I | 1 | 10fF | Any stimulus set (active-high). When asserted, indicates that the chip is attempting to output a stimulus current. |
| qclk_ena | O | 1 | 100fF | Qclk enable (active-high). Asserted whenever qclk is required, ie when any_stimulus is set or a shorting event is detected, provided safeq_disable is not set. |
| qerror[24:0] | O | 25 | 100fF | Charge limit error. A qerror bit is set if corresponding electrode's accumulated charge count is greater than or equal to the value specified by the qlim port. NB qerror is combinatorically generated, but stimulation is disabled as soon as a qerror bit is asserted. Therefore, the accumulator will stop incrementing and the qerror bit will remain asserted until the accumulator is reset via a shorting event. |
| imbalance [24:0] | O | 25 | 100fF | Charge imbalance error. Set if electrode's accumulated charge estimate is non-zero during a shorting event. |
| wasted [24:0] | O | 25 | 100fF | Wasted error. Set if electrode is connected to both a sink and source at the same time. |

During stimulation, the charge_limiter estimates the total current output of the current sources by summing together the enabled lidac values and multiplying the result with the gidac value. The total charge over the whole stimulus period is then estimated for each enabled electrode by adding the calculated current to the accumulated total on every rising edge of qclk. If any of the accumulated totals exceed the value set by qlim, then qerror is asserted. Also, if the accumulated total is non-zero within a certain tolerance during a shorting event, then imbalance is asserted.

The charge_limiter is therefore reliant on qclk being both present and at the expected frequency of 131 kHz for it to operate correctly. For this reason, there is a qclk_break detector in the analog section of the chip that will assert the qclk_break flag if there is no edge on qclk for more than 2 qclk periods while qclk_ena is set. In addition to this, there is a frequency checking circuit, clk_check, in the sys_ctrl module, which asserts the clk_error flag if the frequency of refclk2m is outside the range of 131 kHz±1.6%. In both cases, any stimulation is immediately halted as soon as the flag is set.

In another example, charge monitor operates from a 128 KHz clock used to provide the intervals over which charge is accumulated. The 128 KHz clock may be generated by an MSP430. A 32 KHz clock is also provided to the generator 110, which is also used by the charge monitor/clock watchdog. The watchdog checks the clocks to the charge monitor hardware and flags an error if the 128 KHz clock frequency has an error exceeding 6 KHz (~5%).

The charge_limiter module (i.e. charge monitor) is structural and the operation of each sub-module is given in detail in the sections below. However, there is a small amount of glue logic implemented at the top-level. Firstly, qclk_ena is generated using the following logic equation:

qclk_ena<=(any_stimulus or shorting) and !safeq_disable.

This means that qclk will run during stimulus or for a single cycle when a shorting event is detected, unless the safeq_disable pin is asserted. The reason it has to run during a shorting event is to allow the accumulators to be synchronously reset and the imbalance reg to be synchronously set if the imbalance condition is met.

Secondly, the functionality of the vgena signal is modeled by using it to gate the vgndoe vector. Lastly, there is some logic to determine whether the virtual-ground amplifier output can be treated purely as a current source or sink (vgnd_gnd and vgnd_vddhv), in which case its effect on the accumulated electrode charge can be modeled. That is, if any_ipena is set and any_inena is not set, then the virtual-ground amplifier can be assumed to act as a current sink on the electrodes it is enabled on. Similarly, if any_ipena is not set and any_inena is set, it can be treated like a current source.

Charge_Accum Module

An accumulation register (q) is used to keep track of how much charge would have accumulated on the electrode by estimating the current and adding it to the total at the end of each clock cycle. If the accumulated value gets too large, qerror is asserted and if it is non-zero when shorting occurs, imbalance is asserted.

It should be noted that q is only reset when shorting occurs, so it only keeps track of the total electrode charge for the entire stimulation period, as opposed to the stimulus charge for a single phase. Also, just like the only way to clear the qerror condition is to trigger a shorting event, the only way to clear the imbalance condition is to do a balanced stimulation sequence.

Pseudo-code for each electrode's charge_accum module is as follows:

```
# Determine sign of
current virtual_gndoe =
vgndoe and vgnd_gnd
virtual_vddhvoe = vgndoe
and vgnd_vddhv
ip_on = ipoe[0] or ipoe[1] or ipoe[2]
or ipoe[3] in_on = inoe[0] or
inoe[1] or inoe[2] or inoe[3] sign =
-1 if in_on or gndoe or virtual_gndoe
else
    1
# Determine whether to add current or not
current_gated = current_trunc if in_on or ip_on or vddhvoe
or gndoe or virtual_vddhvoe or virtual_gndoe else
    0
# Generate q-value using a multiplier-
accumulator function q = q +
sign*current_gated if !shorting else
    0
# Truncate q by discarding the 7 least-
significant bits q_trunc = q_abs[15:7]
# Take the absolute value of q using
1s complement q_abs = q xor q[15]
# Compare
q_abs with
qlim qerror
= (q_abs >=
qlim)
# Generate other error
signals imbalance =
(q_abs != 0) if
shorting wasted = ip_on
and in_on
```

NB The above code assumes the following is already performed globally:

gidac is gated to 0 when gena is 0 lidac'j' is gated to 0 when ipena[j] and inena[j] are both 0 scale=(lidac0+1)+(lidac1+1)+(lidac2+1)+(lidac3+1)

current=gidac*scale current_trunc=(current>>9)+1 when current !=0 else (current>>9)

shorting is set whenever previously stimulated electrodes are shorted together

Figure 4:
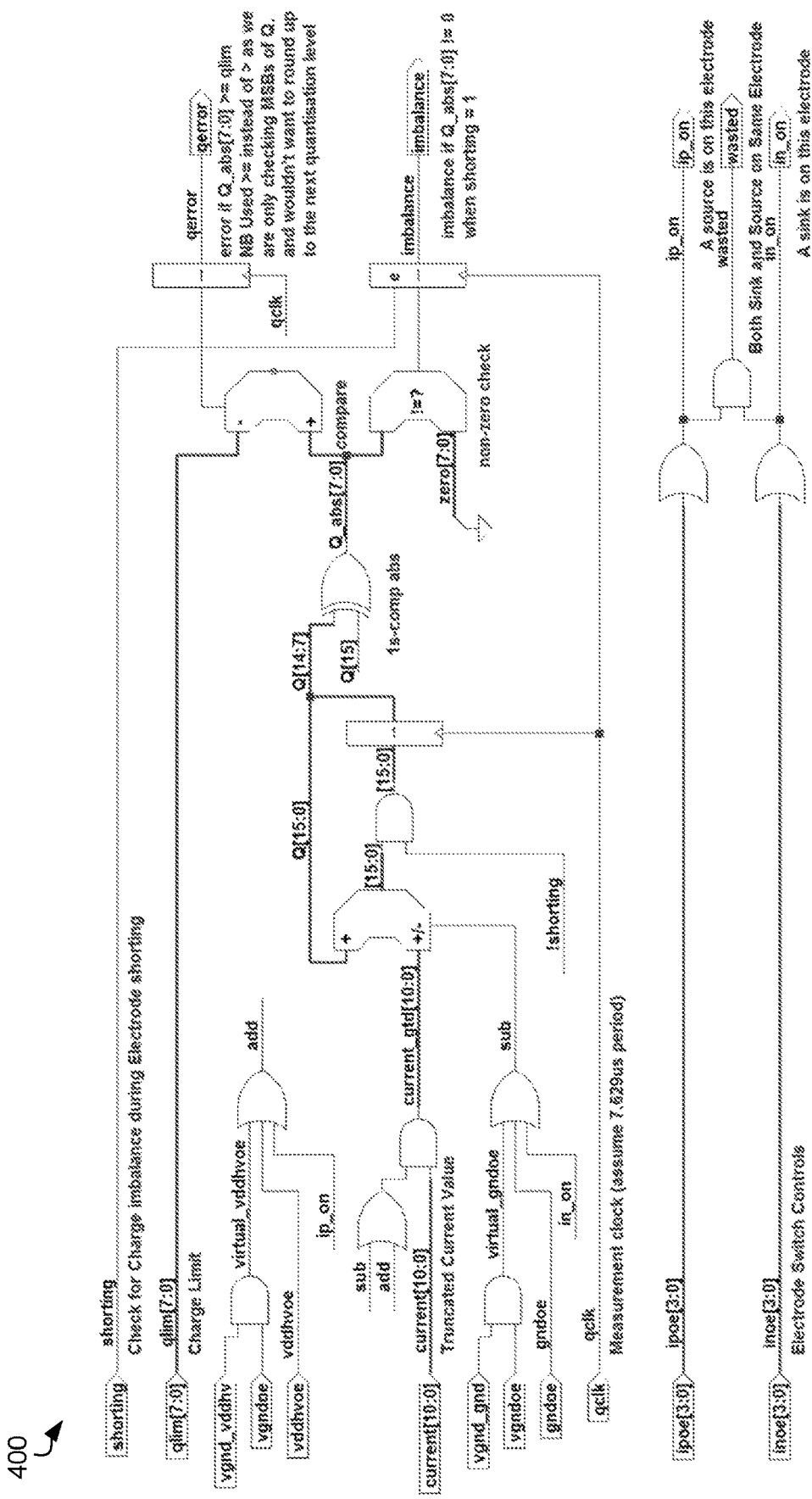
FIG. 4 illustrates an example implementation of a data flow for charge accumulation to monitor the amount of charge delivered to the electrodes.

FIG. 4 illustrates an example implementation of the above data flow. The current value is added to the accumulated sum if the electrode is connected to the corresponding current source, vdd, gnd, virtual_vdd, or virtual_gnd. If the current sources are negative or there is a gnd or virtual_gnd connection, the sum makes a negative contribution to the accumulated total, otherwise it makes a positive contribution. When the 1s complement of the upper 9 bits of q (Q_abs) reaches the value of qlim, qerror is asserted. It is registered on the next rising edge of qclk as it feeds into a sticky bit and therefore must not be able to glitch.

Also, if Q_abs is non-zero during shorting, imbalance is asserted. As the diagram shows, there is no configurable threshold for imbalance detection, as the comparison value is hard-wired to zero. However, tolerance comes from the fact that the 7 least-significant bits are omitted from the zero comparison. Therefore, there is effectively a hard-wired threshold of $2^7-1=127$, and imbalance will be set if q is greater than this value during shorting.

Shorting_Det Module

The shorting_det module detects when a shorting event is taking place. It does this by storing which electrodes have been stimulated since the last shorting event and asserting the shorting signal when these electrodes are all connected to either vddhv, gnd or vgnd. The shorting signal is then used to clear the stimulated_electrodes vector on the next rising edge of qclk.

It should be noted that the exact electrodes that were stimulated are connected together for it to be detected as an actual shorting event. This means that it would not be enough to short all of the electrodes together, for example, if they had not all been stimulated.

Current_Calc Module

The purpose of this module is to calculate an estimate for the current being supplied to the electrodes by adding together the enabled lidac values and multiplying the resulting scale value with the gidac value. As the below block diagram shows, the gidac value is gated to 0 when gena is 0 to model the effect of the global electrode enable signal being set low. Similarly, the individual lidac values are gated to 0 when their corresponding current sources are disabled.

Since a lidac value of "0000" actually corresponds to a current of $\frac{1}{16}$ of full-scale, it is useful to add 1 to each of the lidac values if they are enabled. This means that the final scale value can range from 0 to 64, which is why it uses 7 bits to represent it. In addition, instead of using a separate adder to add 1 to each lidac value, a ones counter is used to count the number of is in (ipena or inena) and this value is used as the input sum for the first adder.

Also, a 1 is added each of the lidac values to model the fact that a lidac setting of 0000 corresponds to a current of $(\frac{1}{16})$*Imax. Otherwise, if all the lidac values were 0000, the accumulators would not increment even though there could be a significant amount of current flowing.

Current_Trunc Module

Due to the fact that the charge_accum module is repeated 25 times, it is important to minimise the number of logic gates it contains. Truncating the current value by a certain number of bits allows the accumulators in the charge_accum modules to be truncated by the same amount, thus saving a significant amount of logic. However, the problem with a simple truncation is that small currents will always be rounded down to 0, which means they won't be added to the accumulator, even though they could still result in the build-up of a significant amount of charge, given enough time. One solution may be to round up the truncated current by adding 1 to the truncated result if the original value was non-zero. This means that the current is always over-estimated, so that the resulting error will always make the qerror flag get tripped too early, which is the safer option.

Digital Core Integration

In one example, the charge monitor 104 is instanced in the controller 105 (digital_core module) together with the stimulator 102 in a single chip. This allows it to get in between the control logic module and the analog interface so it can disable stimulus when it detects an error and allows its status to be easily read using the control interface along with the other status bits.

Figure 5:
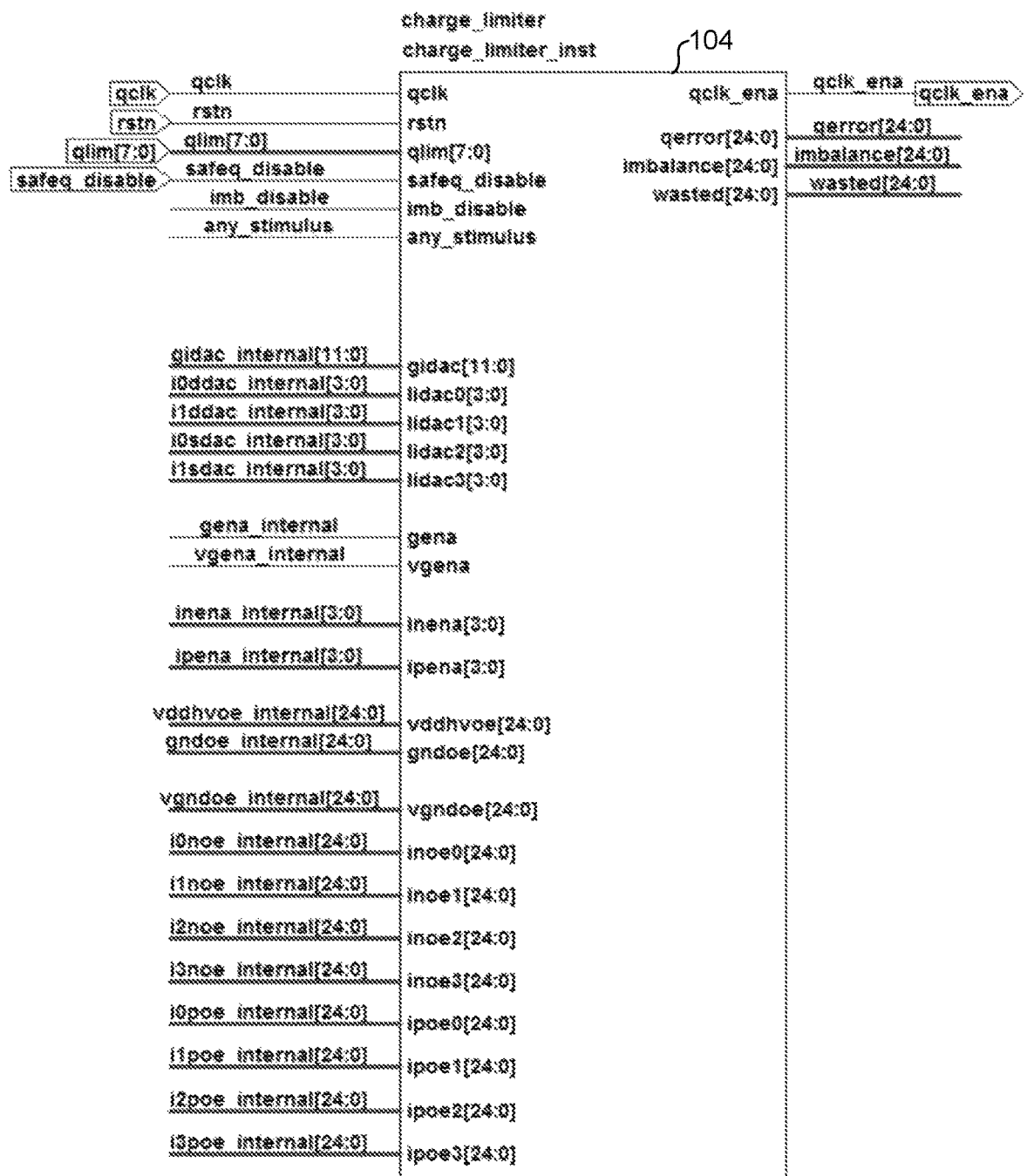
FIG. 5 and FIG. 6 illustrate block diagrams showing how a charge monitor can be integrated into a processor.
Figure 6:
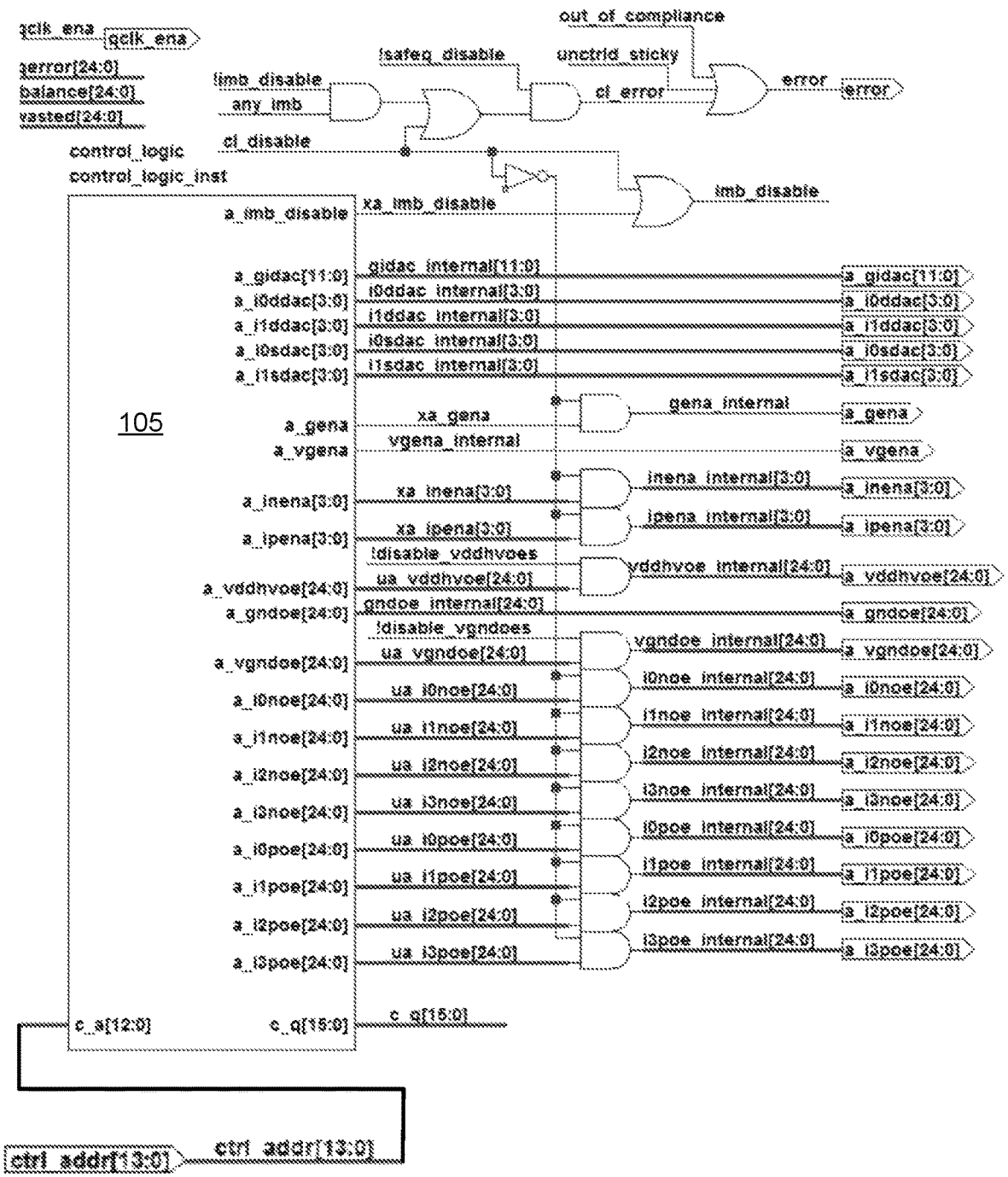

FIG. 5 and FIG. 6 illustrate block diagrams showing how the charge monitor 104 (also referred to as charge limiter) is integrated into the processor 105 (also referred to as digital_core). The connectivity between the charge_limiter 104 and control_logic 105 instances is shown. The stimulus control signals initially come out of the control_logic instance 104 where some are gated with not cl_disable before going to the top-level interface and the charge_limiter 104. It should be noted that not all of the ports for the control_logic module are shown, only those relevant to the charge_limiter.

Figure 7:
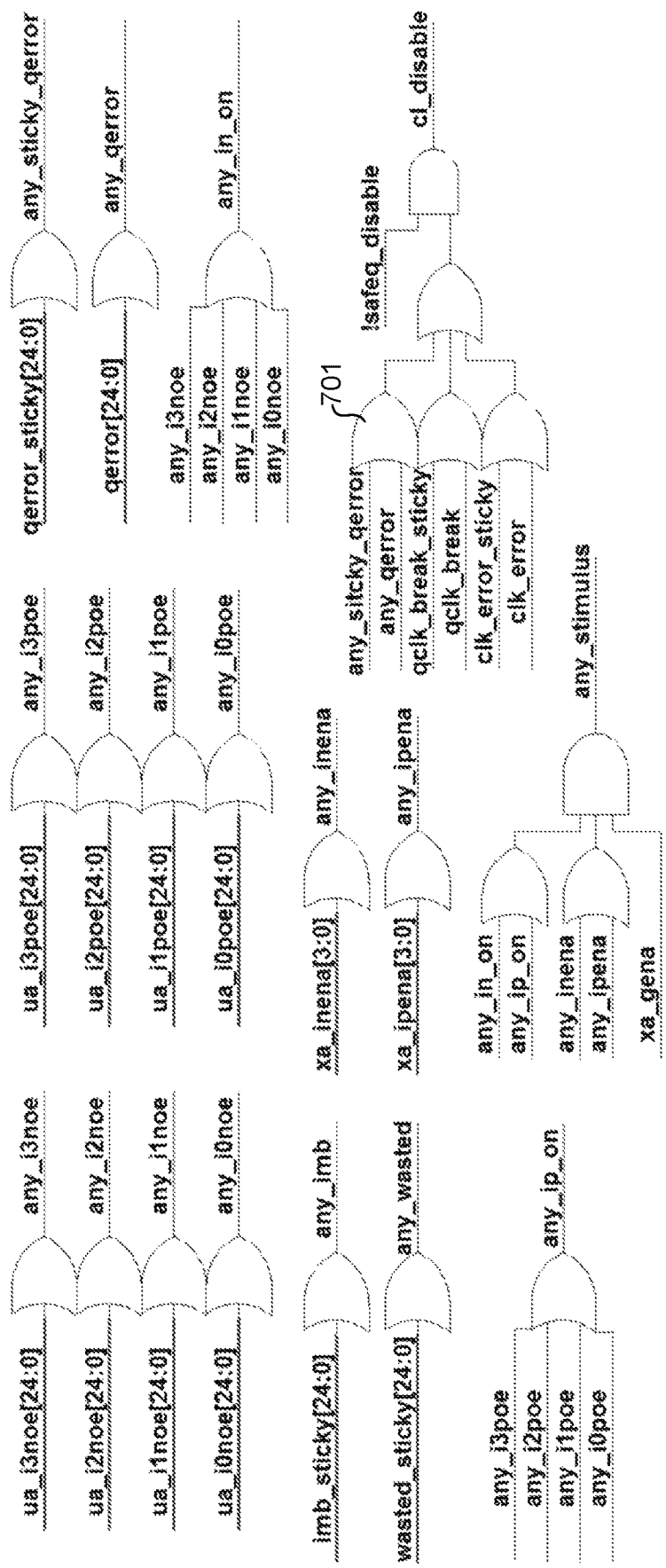
FIG. 7 illustrates a logic implementation for generating a clock disable signal that adjusts the stimulation energy by deactivating stimulation.

FIG. 7 illustrates a logic implementation for generating the cl_disable signal. As the logic shows, the stimulus is disabled for the following conditions:
(any(qerror_sticky) or any(qerror)) and not safeq_disable
(qclk_break_sticky or qclk_break) and not safeq_disable
(clk_error_sticky or clk_error) and not safeq_disable The advantage of the OR operation 701 between the sticky version of the error signal and the non-sticky version is that in case an attempt is made to clear the sticky bit while the error condition still exists. Otherwise, it would be possible for the stimulus to be temporarily re-enabled while the ctrl wen strobe is being held low, which is potentially dangerous.

Factoring this into the logic from FIG. 4, the error interrupt signal is asserted for the following conditions:
(any(qerror_sticky) or any(qerror)) and not safeq_disable
(qclk_break_sticky or qclk_break) and not safeq_disable
(clk_error_sticky clk_error) and not safeq_disable
any(imbalance_sticky) and not imbalance_disable and not safeq_disable.

Figure 8:
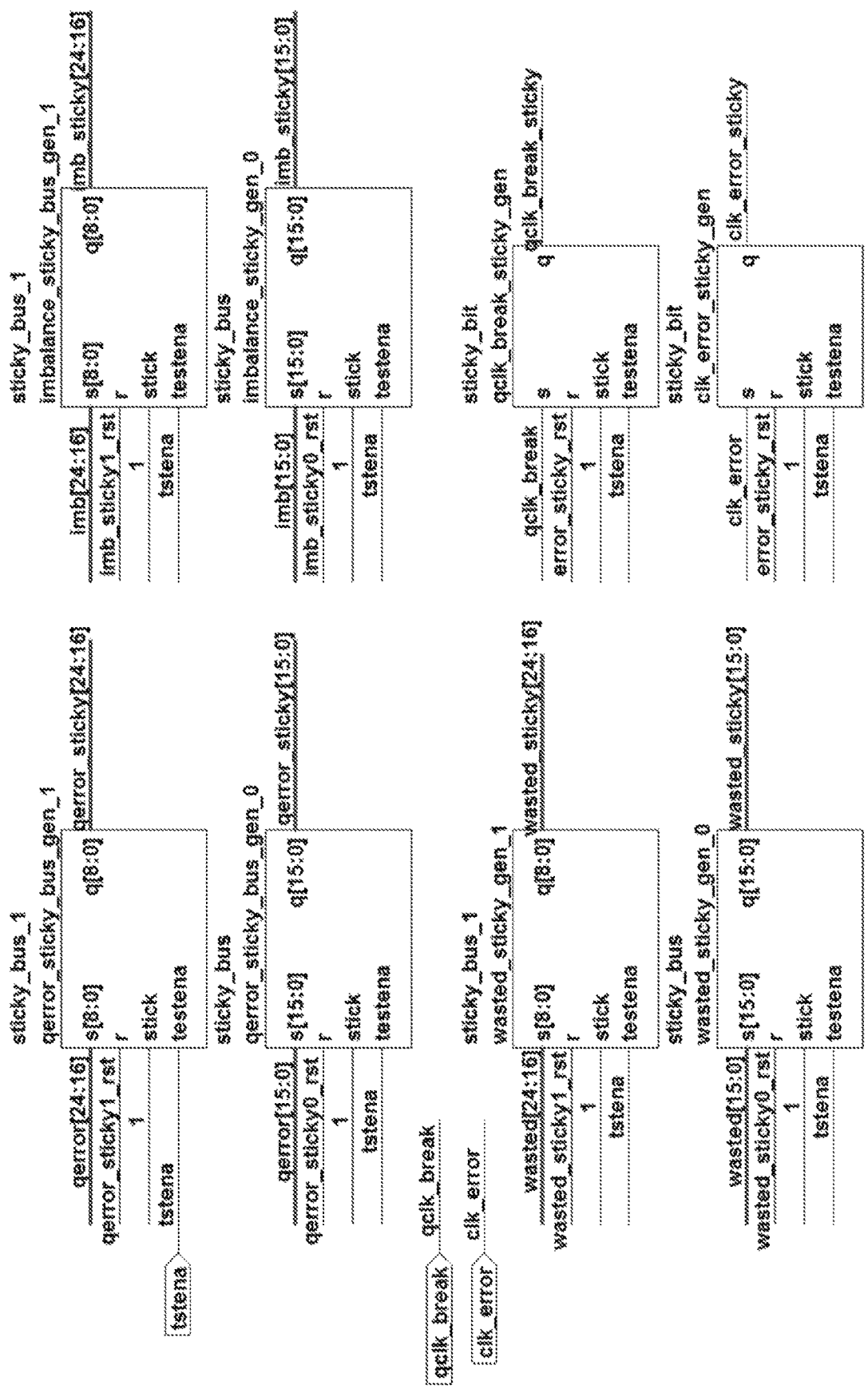
FIG. 8 illustrates part of a digital core with instances for generating the sticky bits.
Figure 9:
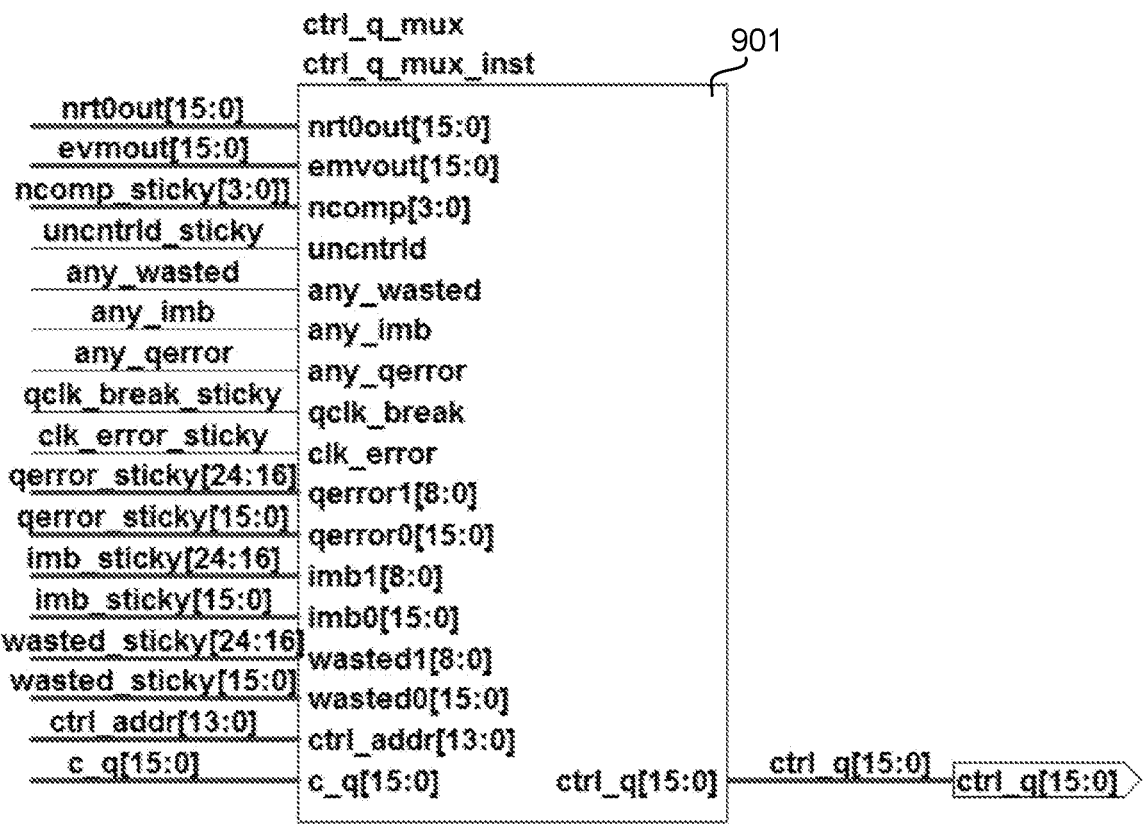
FIG. 9 shows a multiplexer for outputting the status bits using the control data bus.

FIG. 8 illustrates the part of the digital_core with instances for generating the sticky bits. FIG. 9 shows a multiplexer 901 for outputting the status bits using the control data bus. The purpose of the multiplexer is to map the status registers to the control address space using the following table:

TABLE 2

Error Stat Address Map

| Memory Addr | Bit | Signal |
|---|---|---|
| ERROR_STAT @0x1008 | 0 | ncomp_sticky[0] |
| ERROR_STAT @0x1008 | 1 | ncomp_sticky[1] |
| ERROR_STAT @0x1008 | 2 | ncomp_sticky[2] |
| ERROR_STAT @0x1008 | 3 | ncomp_sticky[3] |
| ERROR_STAT @0x1009 | 0 | uncontrolled_current_sticky |
| ERROR_STAT @0x100A | 0 | clk_error_sticky |
| ERROR_STAT @0x100A | 1 | qclk_break_sticky |
| ERROR_STAT @0x100A | 2 | any(qerror) |
| ERROR_STAT @0x100A | 3 | any(imbalance_sticky) |
| ERROR_STAT @0x100A | 4 | any(wasted_sticky) |
| ERROR_STAT @0x100B | 0 | qerror_sticky[0] |
| ERROR_STAT @0x100B | . | . |
| ERROR_STAT @0x100B | 15 | qerror_sticky[15] |
| ERROR_STAT @0x100C | 0 | qerror_sticky[16] |
| ERROR_STAT @0x100C | . | . |
| ERROR_STAT @0x100C | 8 | qerror_sticky[24] |
| ERROR_STAT @0x100D | 0 | imbalance_sticky[0] |
| ERROR_STAT @0x100D | . | . |
| ERROR_STAT @0x100D | 15 | imbalance_sticky[15] |

TABLE 2-continued

Error Stat Address Map

| Memory Addr | Bit | Signal |
|---|---|---|
| ERROR_STAT @0x100E | 0 | imbalance_sticky [16] |
| ERROR_STAT @0x100E | . | . |
| ERROR_STAT @0x100E | 8 | imbalance_sticky [24] |
| ERROR_STAT @0x100F | 0 | wasted_sticky[0] |
| ERROR_STAT @0x100F | . | . |
| ERROR_STAT @0x100F | 15 | wasted_sticky[15] |
| ERROR_STAT @0x1010 | 0 | wasted_sticky [16] |
| ERROR_STAT @0x1010 | . | . |
| ERROR_STAT @0x1010 | 8 | wasted_sticky [24] |

Using this mapping or by other means, it is possible for charge monitor 104 to provide error type signal to processor 105. In turn, processor 105 creates a record on memory 106 of the error type signal. This way, a user, such as a service personnel or a clinician can read-out the error type and discern any problems with the stimulator device 100. In response, the stimulator 100 may be configured differently, such as by changing the desired evoked response, disabling feedback control to switch to open loop control.

In one example, the clk_error signal is a top-level input. This is because it comes from the clk_check module that is now part of the sys_ctrl module. The reason for this is that clk_check now works on the clkref2m clock instead of qclk. This makes the frequency check more accurate (1.6% error instead of 5%) and faster (30.5 us instead of 244 us).

Figure 10:
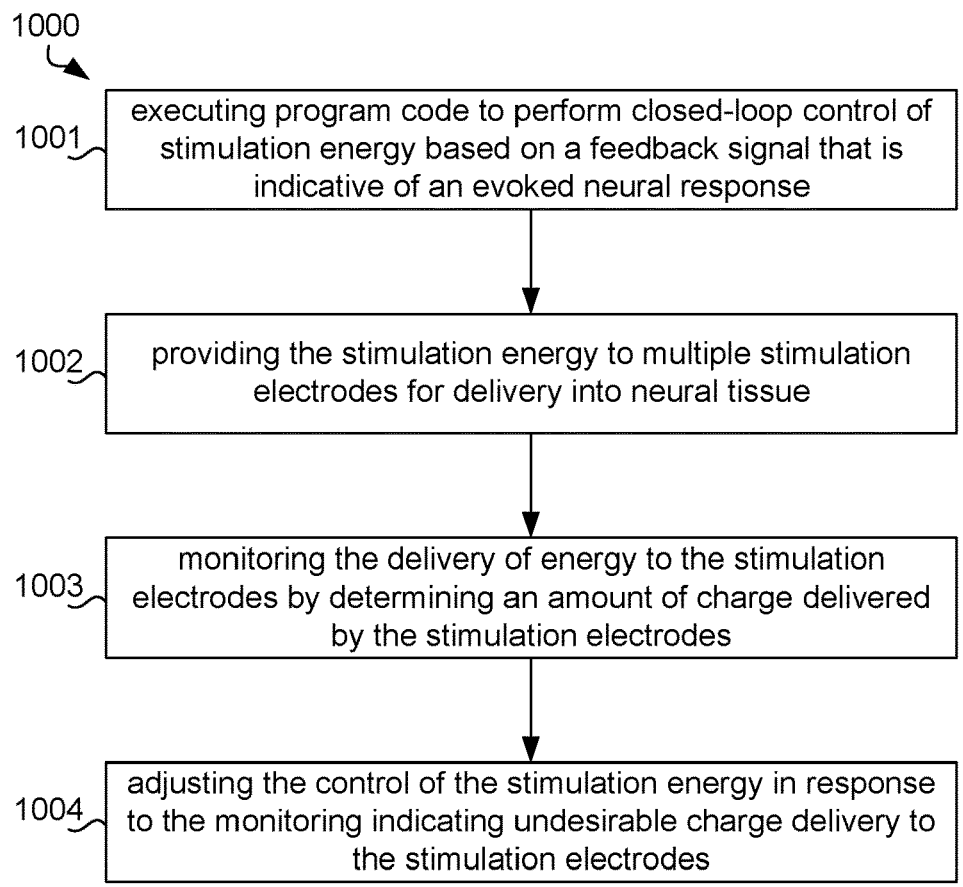
FIG. 10 illustrates a method for neural stimulation.

FIG. 10 illustrates a method 1000 for neural stimulation. The method comprises the steps of executing 1001 program code to perform closed-loop control of stimulation energy based on a feedback signal that is indicative of an evoked neural response as described above. Then, the stimulation energy is provided 1002 to multiple stimulation electrodes for delivery into neural tissue A charge monitor monitors 1003 the delivery of energy to the stimulation electrodes by determining an amount of charge delivered by the stimulation electrodes. Finally, the control of the stimulation energy is adjusted 1004 in response to the monitoring indicating undesirable charge delivery to the stimulation electrodes as also described herein.

Error Analysis

The charge_limiter design may contains the following sources of error:
Rounding error in current value before accumulation due to truncation to save on logic
Quantisation error of charge-value due to 8-bit qlim value
Variability in timing between end of stimulus cycle and qclk
Variability in period of refclk2m signal
Cycle of delay between charge-value exceeding qlim and qerror bit being registered.

The charge error is defined as: $Q_{error} = Q_{actual} - Q_{lim}$; where $Q_{actual}$ is the actual charge where the qerror bit is asserted, and $Q_{lim}$ is the charge limit set by the hard-wired qlim value. Therefore, any error that results in an overestimation of the charge will result in the qerror bit getting set a smaller $Q_{actual}$ value and will therefore be negative. Similarly, any error that results in an underestimation will be positive. In the following sections, the approximate error value is estimated for each error type.

Current Rounding Error

The minimum gidac current is given by: $I_{gidac\_min}$=30.5 nA*100=3.05 uA. Therefore, the minimum electrode current is given by: $I_{min}$=3.05 uA/16=191 nA. The electrode current value is truncated by 9 bits, so the minimum truncated electrode current is given by: $I_{trunc\_min}$=$I_{min}$*29=30.5 nA*100/16*29=97.6 uA This is also the current rounding error and it is always an overestimate as the current is always rounded up. However, the actual error in charge-value depends on the length of time the current is flowing. Choosing an average stimulation time of 1 ms gives the following charge error: $Q_{round\_error}$=−(97.6uA*1 ms)~=−0.10 uC where the value is negative due to it being an overestimation.

Accumulator Quantisation Error

The amount of charge represented by the lsb of the q-value is given by: $Q_{lsb}$=$I_{trunc\_min}$*$T_{qclk}$; where $I_{trun\_min}$ is the minimum truncated electrode current=97.6 uA, and $T_{qclk}$ is the period of qclk=7.629 us=0.745 nC. Allowing for a max charge limit of $Q_{lin}$=14.5 uC, gives an accum value of: accum_val=ceil($Q_{lin}$/$Q_{lsb}$)=ceil(14.5 uC/0.745 nC)=19,474. This value uses 15 bits, but an extra bit is also used for the sign. Therefore, the width of the accumulator may be at least 16 bits to support a charge limit of up to 14.5 uC.

7 bits are omitted from the comparison with the qlim value and qerror is asserted when the remaining accumulator bits are equal to the qlim value, meaning that the charge is again always overestimated. This gives rise to the following charge error: $Q_{quant\_error}$=−(0.745 nC*27)~=−0.10 uC where the value is again negative due to it being an overestimation.

Synchronisation Error

The qclk signal is only enabled when stimulus is enabled, so it is safe to say that qclk will always be synchronous to the stimulation enable signals that actually generate the electrode charge. However, the stimulus controls can still be turned off at any time with respect to qclk, so there will still be some synchronisation error at the end of the stimulus cycle. This error will always result in an overestimation of the charge as the first qclk edge is always generated immediately after the stimulus is enabled so it effectively rounds up the stimulus duration to the nearest qclk period.

Since this a time error, the actual charge error depends on the current, so it can be assumed that the maximum current is 50 mA) to get the worst-case error. $Q_{sync\_error}$=−($I_{stim}$*$T_{qclk}$)=−(50 mA*7.629 us)~=−0.38 uC. Again, the value is negative due to it being an overestimation.

Clock Frequency Error

Since the charge-limiter module uses the qclk signal to measure the charge, it may only be as accurate as the qclk frequency. The percentage error in the qclk will be the same as the percentage error in the refclk2m, which is limited to ±1.6% by the clk_check module. Assuming $Q_{lim}$=14.5 uC, we get the following charge error: $Q_{freq\_error}$=±(0.016*14.5 uC)~±0.23 uC Latency Error To avoid glitches on the qerror signals, they are registered using qclk. This delays the assertion of the qerror signal by a full cycle of qclk from when $Q_{lim}$ was reached, so it is effectively an underestimate of the charge by the following amount: $Q_{latency\_error}$=$I_{stim}$*$T_{qclk}$;=50 mA*7.629 us~=+0.38 uC Total Charge Error The actual electrode charge at which qerror is asserted is given by the following equation: $Q_{act}$=$Q_{lin}$+$Q_{error}$. Therefore, the minimum and maximum values of $Q_{act}$ occur for the minimum and maximum error values, respectively:

$Q_{error\_min}$=$Q_{round\_error\_min}$+$Q_{quant\_error\_min}$+$Q_{sync\_error\_min}$+$Q_{freq\_error\_min}$+$Q_{latency\_error\_min}$+= −0.10uC−0.10uC−0.38uC−0.23uC+0uC=−0.81 uC The maximum value of $Q_{act}$ is calculated using the minimum error values: $Q_{error\_max}$=$Q_{round\_error\_max}$+$Q_{quant\_error\_max}$+$Q_{sync\_error\_max}$+$Q_{freq\_error\_max}$+$Q_{latency\_error\_max}$+=0 uC+0 uC+0 uC+0.23 uC+0.38 uC=+0.61 uC Qlim Calculation The charge limit has been specified as, "an actual charge on the electrodes of 12.7 uC must be allowed". This means that $Q_{act\_min}$ should be set above this value, to prevent an actual charge 12.7 uC from ever causing qerror to be asserted. Therefore set $Q_{act}$_min=13.0 uC.

$Q_{lim}$=$Q_{act\_min}$−$Q_{error\_min}$=13.0+0.81=13.81 uC

The value of $Q_{act\_max}$ can then be calculated using the following:

$Q_{act\_max}$=$Q_{lim}$+$Q_{error\_max}$=13.81+0.61=14.42 uC

Therefore, with a $Q_{lim}$ value of 13.81 uC, qerror won't get asserted before 13.0 uC and will definitely get asserted after 14.42 uC. The actual value that qlim needs to be set to achieve the above Qlim value can be calculated as follows:

qlim=ceil($Q_{lin}$/$Q_{lsb}$)>>7=ceil(13.81uC/0.745nC)>>7=18,548>>7=144

This value is set using the qlim constants instance in the digital module.

Imbalance Threshold

Since imbalance detection is performed on the same value that is compared against the qlim value, the rounding error ($Q_{round\_error}$) acts like a threshold for the charge imbalance. This means that the recorded residual charge has to exceed 0.1 uC to be detected as an imbalance. However, the recorded charge value is also subject to the errors $Q_{quant\_error}$ and $Q_{sync\_error}$, meaning that actual residual charges greater than 0.1 uC may not be detected as an imbalance if they are also affected by these two errors.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An implantable neuro-stimulation device comprising:
multiple stimulation electrodes configured to apply stimulation energy to neural tissue over a stimulus cycle;
an implantable stimulator comprising a controller, the controller configured to perform closed-loop control of the stimulation energy by controlling application of the stimulation energy to the neural tissue, the implantable stimulator further comprising
a charge monitor, the charge monitor comprising circuitry configured to determine an amount of charge delivered by the controller to the stimulation electrodes by the implantable stimulator, for each stimulus cycle of the stimulation energy during application of the stimulation energy to the neural tissue and prior to a subsequent stimulus cycle of the stimulation energy; the charge monitor circuitry being further configured to provide an error signal during the stimulus cycle when the amount of charge determined to be delivered to the stimulation electrodes exceeds a safe charge limit before the end of the stimulus cycle, wherein
the controller is configured to perform the closed-loop control of the stimulation energy based on a feedback signal indicative of a neural response evoked by the applied stimulation energy; and
the controller is further configured to adjust the closed-loop control of the stimulation energy in response to the error signal, wherein the adjusting of the closed-loop control comprises stopping stimulation during the stimulus cycle or disabling closed loop control.

2. The device of claim 1, wherein
the implantable stimulator comprises a current source and the controller is configured to provide a current source activation signal to the current source to activate and de-activate the current source to thereby control the amount of charge delivered to the stimulation electrodes; and
the charge monitor is connected to the current source activation signal to monitor the delivery of energy to the stimulation electrodes by monitoring the current source activation signal.

3. The device of claim 1, wherein the implantable stimulator comprises a current source formed of a first and second transistor connected to each other by respective gate electrodes and the charge monitor is connected to the gate electrodes.

4. The device of claim 3, wherein the charge monitor comprises a third transistor with a gate electrode coupled to the gate electrodes of the first and second transistors, the third transistor providing through a source and drain electrode a current source activation signal.

5. The device of claim 1, wherein the charge monitor is configured to determine an integral of delivered current over a time period when stimulation is activated by the implantable stimulator.

6. The device of claim 5, wherein the charge monitor is further connected to a reference current signal indicative of an instant amplitude of a reference current and the integral over the time period is based on the reference current signal.

7. The device of claim 1, wherein the charge monitor is configured to monitor a stimulation activation signal from the implantable stimulator and the stimulation activation signal is a digital signal.

8. The device of claim 1, wherein the error signal is provided to the controller as an interrupt signal and the implantable stimulator is configured to adjust the control of the stimulation energy by way of an interrupt handling routine that adjusts the control of the stimulation energy.

9. The device of claim 1, wherein the implantable stimulator is configured to adjust the control of the stimulation energy by way of a hardware circuit that disables stimulation in response to the error signal.

10. The device of claim 1, wherein the implantable stimulator is configured to adjust the control of the stimulation energy by one or more of:
adjusting an amplifier gain of a feed-back loop;
adjust a stimulation level; and
enable/disable closed-loop therapy.

11. The device of claim 1, wherein the implantable stimulator is configured to create a data record on memory indicative of the error signal.

12. The device of claim 1, wherein the charge monitor is further configured to detect a charge imbalance error and in response, activate a charge imbalance status signal provided to the controller.

13. The device of claim 12 wherein the charge imbalance status signal, an accumulated charge status signal and a charge waste status signal are combined with a status signal indicative of the amount of charge determined to be delivered to the stimulation electrodes into a single status signal.

14. The device of claim 1, wherein the charge monitor is further configured to detect an accumulated charge error and in response, activate an accumulated charge status signal provided to the controller, wherein the accumulated charge error is indicative of an accumulated charge estimate of one or more of the stimulation electrodes is non-zero during a shorting event.

15. The device of claim 1, wherein the charge monitor is further configured to detect a charge waste error and in response, activate a charge waste status signal provided to the controller, wherein the charge waste error is indicative of one or more of the stimulation electrodes being connected to both a sink and source at the same time.

16. The implantable neurostimulator of claim 1, wherein the controller is further configured to adjust the closed-loop control of the stimulation energy, by way of a hardware circuit that disables stimulation during application of the stimulus cycle, in response to the error signal.

17. The implantable neurostimulator of claim 16, wherein the hardware circuit comprises a switch in a power signal to the electrodes that is turned off by the error signal.

18. A method for neuro-stimulation, the method comprising:
performing, using a controller of an implantable stimulator, closed-loop control of stimulation energy over a stimulation cycle;
delivering, using the implantable stimulator, the stimulation energy to multiple stimulation electrodes for application to neural tissue;
determining, by circuitry on the implantable stimulator, for each stimulus cycle of the stimulation energy during application of the stimulation energy to the neural tissue and prior to a subsequent stimulus cycle of the stimulation energy, an amount of charge delivered to the stimulation electrodes;
generating, by the implantable stimulator, a status signal indicative of the amount of charge determined to be delivered to the stimulation electrodes;
communicating, by the implantable stimulator, to the controller the status signal indicative of the amount of charge determined to be delivered to the stimulation electrodes;
performing, by the controller, the closed-loop control of the stimulation energy based on a feedback signal that is indicative of a neural response evoked by the delivered stimulation energy; and
adjusting, by the controller, the closed-loop control of the stimulation energy in response to the status signal comprising an error signal provided during the stimulus cycle, the error signal indicating that the determined amount of charge delivered to the stimulus electrodes exceeds a safe charge limit before the end of the stimulus cycle;
wherein the adjusting of the closed loop control comprises stopping stimulation during the stimulus cycle in which the error signal occurs, or disabling closed loop control.

19. An implantable stimulator comprising:
a controller configured to control delivery of stimulation energy over a stimulus cycle to multiple stimulation electrodes, and
a charge monitor comprising circuitry of the implantable stimulator, the charge monitor configured to continuously determine during a stimulus cycle and prior to a subsequent stimulus cycle of the stimulation energy, an amount of charge delivered by the implantable stimulator to the stimulation electrodes, wherein the charge monitor circuitry is configured to set an error signal during the stimulus cycle, the error signal being indicative of the amount of charge determined to be delivered to the stimulation electrodes exceeding a safe charge limit before the end of the stimulus cycle;

the controller is configured to perform closed-loop control of the stimulation energy based on a feedback signal that is indicative of a neural response evoked by the delivered stimulation energy; and the controller is further configured to disable the closed-loop control of the stimulation energy during the stimulus cycle in response to the error signal being set.

* * * * *